Figure 1:
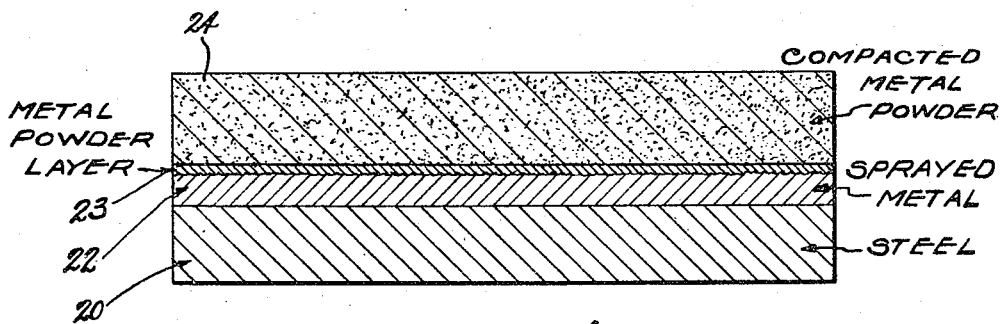

July 29, 1947. D. W. DE BRA 2,424,557
COMPOSITE ARTICLE AND METHOD OF MANUFACTURE
Filed June 27, 1944

INVENTOR
Donald W. De Bra
BY
his ATTORNEY

Patented July 29, 1947

2,424,557

UNITED STATES PATENT OFFICE 2,424,557

COMPOSITE ARTICLE AND METHOD OF MANUFACTURE

Donald W. De Bra, Dayton, Ohio, assignor to General Motors Corporation, Detroit, Mich., a corporation of Delaware Application June 27, 1944, Serial No. 542,289

6 Claims. (Cl. 29—191.2)

This invention relates to composite articles and is particularly concerned with composite articles including a sprayed metal layer and a porous metal layer supported upon and bonded to a strong metal backing material through said sprayed metal layer.

It is an object of the invention to provide a new article of manufacture and a method for making such article wherein porous metal is bonded to a stronger metal backing member through the medium of a sprayed metal layer.

Another object of the invention is to provide a means for attaching a porous metal layer to a strong metal backing member whereby the porous metal layer is metallurgically bonded to a strong metal backing member.

In carrying out the above object it is a further object of the invention to provide composite article including a porous metal layer and a strong non-porous metallic backing member wherein a sprayed metal layer of a metal other than the metal in either the porous metal layer or the strong metal backing member is used as an intermediate bonding layer therebetween. In some cases it is desirable to just spread a layer of metal powder on the sprayed layer which is the same metal as the sprayed layer.

Another object of the invention is to provide a method for making a composite metal article comprising a steel backing or supporting plate and a porous iron wear surface bonded to the steel through an intermediate sprayed copper layer.

A still further object of the invention is to provide a friction plate for use as a clutch, brake, or the like which includes a ferrous friction surface integrally bonded to a steel support or backing member by an intermediate layer including a high percentage of copper.

Further objects and advantages of the present invention will be apparent from the following description, reference being had to the accompanying drawings wherein preferred embodiments of the present invention are clearly shown.

Figure 2:
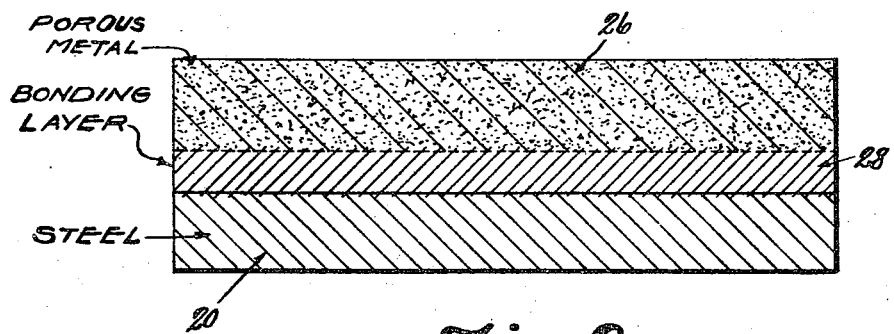

In the drawings:

Fig. 1 is a view in cross section of a wear plate which can be used as a friction plate including a porous metal layer, a sprayed metal layer and a steel backing member prior to sintering; and Fig. 2 is a view of the same wear plate after sintering of the metal powder layer.

In the manufacture of the friction articles it has been found that porous metal friction surfaces are particularly adaptable to heavy duty use. For example, numerous applications of airplane brakes are today utilizing porous metal surfaces. One of said surfaces which is particularly advantageous due to its wear resistance, good frictional properties and high strength is a porous iron layer integrally bonded to a reenforcing backing member of steel or the like. In order to bond porous iron to the steel and get a bond of satisfactory strength, it is necessary to interpose a strata of a bonding metal between the porous metal layer and the supporting member. One of such strata comprises a copper layer which may include small quantities of silver, the copper has a bonding affinity for both the porous iron and the steel and in effect brazes the porous iron to the steel through inter-diffusion of the copper into the juxtaposed surfaces. A clutch, or brake member, formed by this method is disclosed and claimed in copending application Serial No. 433,598, Gleszer and Koehring, now Patent No. 2,359,361, assigned to the assignee of the present invention. Airplane brakes made by the method disclosed in this application are operating with extreme satisfaction in large numbers. In this case the high copper bonding layer is produced from metal powder. The present invention is directed to another method of making friction plates of the character described wherein the operation is expedited by the elimination of the interposed cupreous layer of metal powder and wherein this interposed layer is formed by spraying copper or cupreous material on to the backing member. It has been found that in the present operation the strength of bond in the finished article is satisfactory through the use of this sprayed metal layer. It has been noted, however, that in some instances the sprayed metal layer is not analogous to a sintered metal layer made from metal powder wherein the final sintering period is of the same duration and therefore the use of sprayed metal as a substitute for sintered metal can not be universal since the physical characteristics are not usually as high from a strength angle as when using sintered metal powder unless longer sintering periods are utilized to cause greater diffusion. However, in the present instance, due to the peculiar nature of the application, and the particular metals utilized, the sprayed cupreous layer forms an article of suitable strength and has the other desired characteristics when using relatively short sintering periods. In many instances where large areas are involved, copper powder spread on the sprayed metal in a thin layer increases the strength of bond by making the bond coextensive and uninterrupted.

In carrying out the invention, a steel supporting plate is utilized made from ordinary 1035 to 1045 cold rolled steel or the like, as shown at 20. This plate has sprayed thereon a thin layer of copper or high copper material 22. The thickness of the cupreous layer varies in accordance with a number of variables which wlil be discussed in more detail later and in most instances is desired to be in the order of from .006 to .015"—preferably .012". On this cupreous layer after which copper powder 23 is spread to a depth of .005–.015" iron powder 24 is applied to a depth of from .020 to .050" and the powder is then briquetted. The briquetting pressures may vary in accordance with the properties desired although briquetting pressures in the order of 30,000 pounds per square inch are preferred. This range, however, may vary between 20,000 to 60,000 pounds per square inch with satisfactory results. Obviously the higher the briquetting pressure, the lower the porosity of the part and, as a rule, the greater the strength. This composite article is then placed in a sintering furnace and sintered between 1900 and 1950° F.—preferably 1930° F. for varying periods preferably about one-half hour in a suitable non-oxidizing atmosphere. During this sintering period the compacted iron powder is bonded together into a strong porous frame work 26 or matrix wherein each particle of iron is metallurgically bonded to each adjacent particle. The porous iron surface is also bonded to the steel plate through the diffusion of copper in the interposed copper layer 28. This thin layer of sprayed copper at the temperature involved during sintering tends to diffuse into the iron in the porous iron layer and into the steel. The extent of diffusion depends upon the temperature and time of sintering. The copper powder layer facilitates bonding through intimate contact with the iron and the sprayed copper.

The sprayed metal layer has a second function, namely, that of holding or gripping the compacted metal powder to the surface of the steel during sintering. It has been found, for example, that if powdered metal is briquetted directly on steel in a large area that difficulty is experienced in obtaining a bond therebetween unless pressure is applied during sintering. This is caused by the fact that the steel and the compacted metal layer are inclined to warp under heat which destroys the contact between the two surfaces at many points therebetween. By interposing a sprayed metal layer between the compacted metal powder and the steel the roughness of the sprayed metal is utilized to act as an interlock for the metal powder which is compacted thereon. This is very similar although obviously not as complete as when using an interposed sintered metal layer. Thus the sprayed metal layer mechanically holds the steel and compacted metal powder together during the sintering by mechanical forces which permits a mutual bond to become apparent through diffusion of the copper.

It is understood that in the foregoing disclosure directed to a friction surface that the copper layer may be an alloy of copper if desired provided that copper predominates. Likewise the porous metal layer may be an alloy of iron but in all cases iron predominates. For example, some carbon may be present either combined or as graphite as some small quantity of alloying ingredients may be in the powder. Similarly the backing member may be of steel, iron or any alloy thereof or it may be some other strong metal, the only requirement being that the copper will bond thereto.

Referring again to the sprayed metal layer, this is produced on the steel by means of a metal spray gun such as a "Shoop gun" or any other metallizing gun. The metal is sprayed from the gun by means of an oxy-acetylene flame and in the present embodiment an acetylene pressure of 12.5 pounds per square inch, oxygen pressure of 13 pounds per square inch and air pressure of 45 pounds per square inch for a wire speed of four feet per minute and ⅛" copper wire is preferred. A sprayed metal layer .012" thick was made by utilizing three separate passes of the gun when spraying, wherein each strata of sprayed metal varied from .004 to .005" thick. The steel prior to the metal spray is first conditioned by sand blasting or grit blasting to form a clean rough surface. Obviously, this surface can likewise be obtained by acid pickling or any other well known methods. It was found that the wire speed to some extent determines the type of surface of the sprayed metal layer, that is, roughness or coarseness of the surface. However, numerous tests were made with different speeds of the wire to obtain different roughness on the surface but it did not appear after the iron powder was briquetted thereon and sintered that this difference in roughness changed the over-all strength of the bond. The roughness was measured by counting the number of peaks per square inch on the surface of the sprayed metal and in this instance it was found that when the roughness varied from 4,000 to 9,000 peaks that the final strength of the bond between the briquetted iron powder and steel did not vary appreciably. Likewise the strength or tenacity of the hold between the briquetted iron layer and the sprayed metal layer did not vary appreciably which leads to the conclusion that the sprayed metal roughness is of little importance just so long as the layer is rough.

After sintering, shear strength tests were run to determine the strength of the bond between the porous iron and the steel backing and it was found that an average strength in the order of 10,000 pounds per square inch could be obtained which strength is satisfactory for the intended use. This shear strength was determined in a standard shearing fixture. It was noted that the laminations in the sprayed metal layer completely disappeared after sintering which shows that there is not only diffusion of the cupreous layer into the steel and porous iron layer but likewise there is diffusion in the cupreous layer itself which homogenizes the layer thereby strengthening the same.

From the foregoing it is apparent that the method disclosed herein produces a satisfactory strong bond between a porous ferrous layer and a strong metal backing plate and that the method permits satisfactory bonding of a porous metal layer to a metal backing plate without the application of pressure during sintering of the porous metal.

It is likewise manifest that a similar method may be utilized to bond other metals to steel. For example, bronze powder layers can be bonded to steel by a similar procedure wherein high tin bronze is sprayed onto the steel; aluminum or an alloy powder layer can be bonded to steel through use of a sprayed aluminum layer, or nickel-copper powder can be bonded to steel or nickel backing members by the use of either high copper-nickel alloy sprayed layer or a copper sprayed layer. In most instances the sprayed metal layer preferably is of a lower melting point than the major portion of the metal in the porous metal powder layer so that the metal powder can be sintered at a suitable temperature which approaches but is below the melting point of the metal in the sprayed metal layer. Also in all cases where large areas are involved metal powder of an analysis approaching the analysis of the sprayed metal may be spread on the sprayed metal prior to briquetting of the porous metal layer, thus facilitating a coextensive bond.

It is apparent that the use of a sprayed metal layer is advantageous in many instances since its application is more economical than the use of a sintered noncompacted powder for the same purpose as disclosed in the aforementioned Gleszer and Koehring application. Then too the sprayed metal facilitates and expedites the manufacture since the steel plate has no tendency to warp during the application thereof due to lower temperature.

While the embodiments of the present invention as herein disclosed, constitute preferred forms, it is to be understood that other forms might be adopted, all coming within the scope of the claims which follow.

What is claimed is as follows:

1. In the process of making composite metal articles including a layer of porous metal bonded to a strong steel supporting member, the steps of suitably preparing the steel for a spraying operation, spraying metal onto the surface of the steel in a layer in the order of .010" thick, briquetting metal powder having a major portion of relatively higher melting point than the metal in the sprayed metal layer upon the sprayed metal layer and then sintering the composite article in a non-oxidizing atmosphere and at a temperature approaching but below the melting point of the metal in the sprayed metal layer for a time sufficient to sinter together the metal in the metal powder layer into a strong porous metal layer and simultaneously cause substantial diffusion of the metal in the sprayed metal layer into both the steel backing member and into the metal of the porous metal layer.

2. In the method of making a composite article comprising a ferrous wear surface bonded to a steel supporting member, the steps of sand blasting a steel supporting member, spraying cupreous metal upon the surface thereof in a layer of substantial thickness, spreading a thin layer of cupreous metal powder on the sprayed metal, applying a relatively thicker layer of iron powder thereon briquetting the cupreous powder and the iron powder onto the surface of the sprayed metal in a layer of at least twice the thickness of the sprayed metal, sintering the composite article so formed under non-oxidizing conditions and at a temperature ranging between 1900 and 1950° F. for a period of about one-half hour for causing the homogenization of the cupreous layer and the sintering of the ferrous layer and simultaneously causing a diffusion of the cupreous material into the ferrous layer and into the steel.

3. In a method of making friction articles comprising a porous iron friction surface integrally bonded to a steel supporting member, the steps comprising, preparing a backing member, spraying copper onto the surface of said member in a layer of appreciable thickness, briquetting iron powder onto the sprayed metal surface in a thickness of at least twice the thickness of the sprayed metal layer, sintering the composite article so formed under non-oxidizing conditions for about one-half hour at a temperature of between 1900° and 1950° F. for causing the briquetted iron powder to sinter together into a porous iron layer and for homogenizing and simultaneously diffusing the copper layer into the porous iron layer and into the steel.

4. In the method of making composite friction articles comprising a steel backing member and a porous iron friction surface, the steps of sand blasting the surface of a steel supporting member, spraying copper onto the surface of said member in a layer having a thickness in the order of .010", briquetting iron powder onto said copper layer to a thickness of at least .020", sintering the composite article so formed under non-oxidizing conditions for about one-half hour at a temperature of about 1930° F. for causing the briquetted iron layer to sinter together into a strong porous iron layer integrally bonded to the surface of the steel plate through the interposed copper layer.

5. A new article of manufacture comprising: a composite structure including a sintered porous metal layer bonded co-extensively to a strong metal supporting back through the medium of a sprayed metal layer which was applied to the back prior to the application of metal powder thereto whereby the sprayed metal layer was homogenized and metallurgically diffused during the sintering of the metal powder layer.

6. A new article of manufacture comprising: a composite structure including a sintered porous ferrous layer bonded co-extensively to a steel supporting back through the medium of a sprayed copper layer which was applied to the back prior to the application of the porous ferrous layer whereby the sprayed copper layer is homogenized and metallurgically diffused during the sintering of the ferrous porous layer.

DONALD W. DE BRA.

REFERENCES CITED

The following references are of record in the file of this patent:

UNITED STATES PATENTS

| Number | Name | Date |
|---|---|---|
| 1,761,506 | Williams | June 3, 1930 |
| 2,151,410 | Koehring | Aug. 5, 1941 |
| 2,241,095 | Marvin | May 6, 1941 |
| 1,998,496 | Fieldler | Apr. 23, 1935 |
| 2,232,176 | Guthvie | Feb. 18, 1941 |